US010504085B2

United States Patent
Phillips et al.

(10) Patent No.: US 10,504,085 B2
(45) Date of Patent: Dec. 10, 2019

(54) IDENTIFYING TRANSACTIONS AT SELF-CHECKOUT TERMINALS

(71) Applicant: MasterCard International Incorporated, Purchase, NY (US)

(72) Inventors: Gregory S Phillips, St Louis, MO (US); Claire Le Gal, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 795 days.

(21) Appl. No.: 15/138,763

(22) Filed: Apr. 26, 2016

(65) Prior Publication Data

US 2017/0308880 A1 Oct. 26, 2017

(51) Int. Cl.
*G06Q 20/18* (2012.01)
*G06Q 20/40* (2012.01)

(52) U.S. Cl.
CPC ............ *G06Q 20/18* (2013.01); *G06Q 20/409* (2013.01); *G06Q 20/4012* (2013.01); *G06Q 20/4016* (2013.01)

(58) Field of Classification Search
CPC ............... G06Q 20/18; G06Q 20/4012; G06Q 20/4016; G06Q 20/409
See application file for complete search history.

(56) References Cited

U.S. PATENT DOCUMENTS

| | | | | |
|---|---|---|---|---|
| 6,848,613 | B2 * | 2/2005 | Nielsen | G06Q 20/04 235/379 |
| 6,990,463 | B2 * | 1/2006 | Walter | A47F 9/046 235/383 |
| 7,970,669 | B1 * | 6/2011 | Santos | G06Q 10/087 235/379 |
| 9,563,886 | B1 * | 2/2017 | Catoe | G06Q 20/208 |
| 2009/0076922 | A1 * | 3/2009 | de Gruil | G06Q 10/06 705/16 |
| 2015/0379497 | A1 * | 12/2015 | Florez | G06Q 40/12 705/17 |
| 2016/0283942 | A1 * | 9/2016 | Chitragar | G06Q 20/4016 |

* cited by examiner

*Primary Examiner* — Seung H Lee
(74) *Attorney, Agent, or Firm* — Buckley, Maschoff & Talwalkar LLC (57) ABSTRACT

A method and system include identifying, at a merchant device, a purchase transaction at a self-checkout terminal, wherein the purchase transaction is via a payment card product; generating a self-checkout terminal indicator; receiving, by a computer from the merchant device, a payment authorization request for the purchase transaction, wherein the payment authorization request comprises payment data and the self-checkout terminal indicator; and transmitting information associated with the self-checkout terminal indicator to an issuer. Numerous other aspects are provided.

19 Claims, 4 Drawing Sheets

| PAN | SELF-CHECKOUT TERMINAL INDICATOR | PIN(1) OR SIGNATURE (2) | SEMI-ATTENDED OR UNATTENDED (0) OR ATTENDED (1) | TERMINAL IDENTIFICATION CODE |
|---|---|---|---|---|
| 0111234567890 | CAT-1-0-50 | 1 | 0 | 50 |

FIG. 5

IDENTIFYING TRANSACTIONS AT SELF-CHECKOUT TERMINALS

BACKGROUND

When a consumer makes a purchase at an attended point of sale terminal ("point of sale transaction") with a physical payment card (e.g., a credit card or a debit card), where the physical payment card may have visual security features such as a valid hologram, security code, printed numbers, a signature panel, etc., there are procedures or rules the attendant (or cashier) may follow to determine the validity of the card. For example, the attendant may check the valid date and the expiration date on the front of the card; compare the first four digits of the primary account number (PAN) on the card front with the four digits printed below the PAN, to ensure the same digits appear in the same sequence; compare the four-digit truncated PAN imprinted in the signature panel with the last four digits of the PAN on the card front; compare the PAN on the card front with the number displayed on, or printed from, the terminal; if a photograph of the cardholder is present on the card, compare the photograph on the card with the person presenting the card; and check that the card is signed. In some instances, these procedures may not apply when a Chip Transaction is completed with PIN as the cardholder verification method (CVM).

Increasingly, purchases are made at self-checkout (SCO) terminals and unattended cardholder-activated terminals (CATs). In the United States, for example, SCO terminals may be popular in grocery and large retail stores. SCO terminals may be a blend between the attended point of sale terminals and unattended CATs. Frequently there may be an attendant in the area, but the attendant may not actively monitor the payment transaction. If the attendant does not handle the card, as with SCO and CAT terminals, the attendant may not be able to assess the validity of the card per the rules and procedures described above with respect to the point of sale (POS) transactions. As such, SCO and CAT terminals may carry a different level of fraud risk compared to an attended terminal.

In terms of recording and tracking the transactions, conventional transactions at SCO and CAT terminals may not be isolated as such, and instead may be identified as attended POS transactions by Issuers, Acquirers and card associations (e.g., MasterCard). Conventionally, merchants set the codes associated with attended POS transactions according to Acquirer instructions, which are based on standards established by card associations (e.g., MasterCard). Merchants send data to Acquirers, who reformat the data into the MasterCard or other card format.

The present inventors have now realized that it may be desirable to differentiate transactions at SCO and CAT terminals from attended POS transactions in the tracking of transactions.

DETAILED DESCRIPTION

When a consumer makes a purchase at an attended point of sale terminal with a physical payment card (e.g., a credit card or a debit card), where the physical payment card may have visual security features such as a valid hologram, security code, printed numbers, a signature panel, etc., there are procedures or rules the attendant (or cashier) may follow to determine the validity of the card. For example, the attendant may check the valid date and the expiration date on the front of the card; compare the first four digits of the primary account number (PAN) on the card front with the four digits printed below the PAN, to ensure the same digits appear in the same sequence; compare the four-digit truncated PAN imprinted in the signature panel with the last four digits of the PAN on the card front; compare the PAN on the card front with the number displayed on or printed from the terminal; if a photograph of the cardholder is present on the card, compare the photograph on the card with the person presenting the card; and check that the card is signed. In some instances, these procedures may not apply when a Chip Transaction is completed with PIN as the cardholder verification method (CVM).

Increasingly, purchases are made at self-checkout (SCO) terminals and unattended cardholder-activated terminals (CATs). As of the end of 2013, there were an estimated 191,000 self-checkout units worldwide, with the number forecasted to reach 325,000 units by 2019. In the United States, for example, SCO and CAT terminals may be popular in grocery and large retail stores. SCO terminals may be a blend between the attended point of sale terminals and unattended CATs.

As used herein, a SCO terminal 104 may be an unattended or semi-attended cardholder activated terminal (CAT) that supports more than one cardholder verification method and allows cardholders to process their own purchases without direct interaction with a card acceptor agent ("attendant"). As used herein, the terms "SCO" and "CAT" may be used interchangeably. Frequently there is an attendant 202 (FIG. 2) in the area, but the attendant may not actively monitor the payment transaction. In some instances, no more than six SCO terminals may be under the supervision of a single attendant. Other suitable numbers of SCO terminals may be under the supervision of a single attendant 202.

In some embodiments, an unattended CAT terminal may be, for example a handheld checkout device or a scanner or application in a mobile device. A handheld checkout device may be owned and controlled by the merchant 109, and may be handheld or attached to a shopping cart/basket but operated by the cardholder who scans items for purchase. Other merchants may use a scanner that can scan all of the items in a cart/basket with little or no interaction by the cardholder. A mobile device owned and operated by the cardholder may also scan items for purchase using the mobile device's camera and a SKU application.

If an attendant does not handle the card (e.g., FIG. 2), as with SCO and CAT terminals 104, the attendant 202 may not be able to assess the validity of the card per the rules and procedures described above with respect to the attended POS transactions. As such, SCO and CAT terminals may carry a different level of fraud risk compared to an attended terminal. For example, if a card at a specific SCO terminal is found to be compromised, the next transaction at that terminal may have a higher probability of being fraudulent as the fraudster tries another stolen account number in the unattended or semi-attended environment. Similar actions (e.g., the use of multiple counterfeit and/or stolen cards) at an attended terminal may arouse a cashier's suspicious, and therefore may be avoided.

In terms of recording and tracking the transactions, transactions at SCO terminals may not be conventionally isolated as such, and instead may be identified as attended POS transactions by Issuers, Acquirers and card associations (e.g., MasterCard). Conventionally, merchants set the codes associated with attended POS transactions according to Acquirer instructions, which are based on standards established by card associations (e.g., MasterCard). Merchants send data to Acquirers, who reformat the data into the MasterCard or other card format.

The present inventors have now realized that it may be desirable to differentiate transactions at SCO and CAT terminals from attended POS transactions in the tracking of transactions. Differentiating the transactions may allow Issuers, Acquirers and MasterCard to better assess what, if any, actions may improve valid payment product acceptance and increase the decline of fraudulent payment product authorization attempts at SCO terminals. The differentiated information may be fed into fraud models at merchants, acquirers, payment networks and issuers who use a SCO indicator for fraud prevention purposes. Visibility into SCO terminal transactions may also allow for faster identification of account data compromise events when SCO terminals may be at risk. Differentiating transactions may also facilitate the analysis of risk in these SCO terminal transactions to pinpoint: areas that may be compromised, weaknesses in the system; and weaknesses at the merchant 109. Differentiating the transactions may also facilitate the analysis of a transactional history of a particular card number. Transactional history analysis may provide for identification of fraudulent transactions without increasing the false positive rate, as it may be desirable to minimize instances where a transaction appears to be fraudulent on its face, but is actually a legitimate transaction (false positive).

Figure 1:
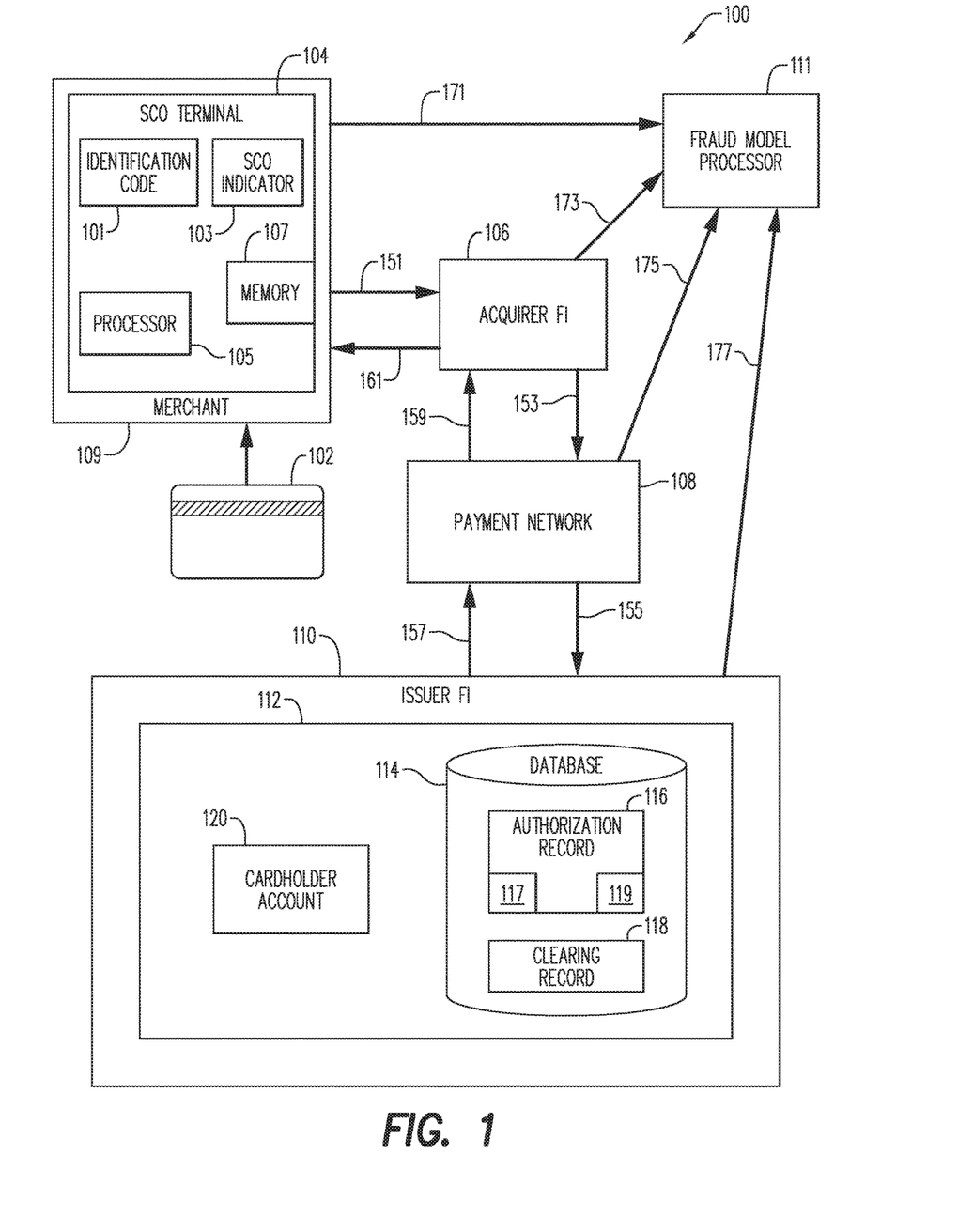
FIG. 1 is a schematic block diagram representation of a payment system, in accordance with some aspects of some embodiments herein.
Figure 2:
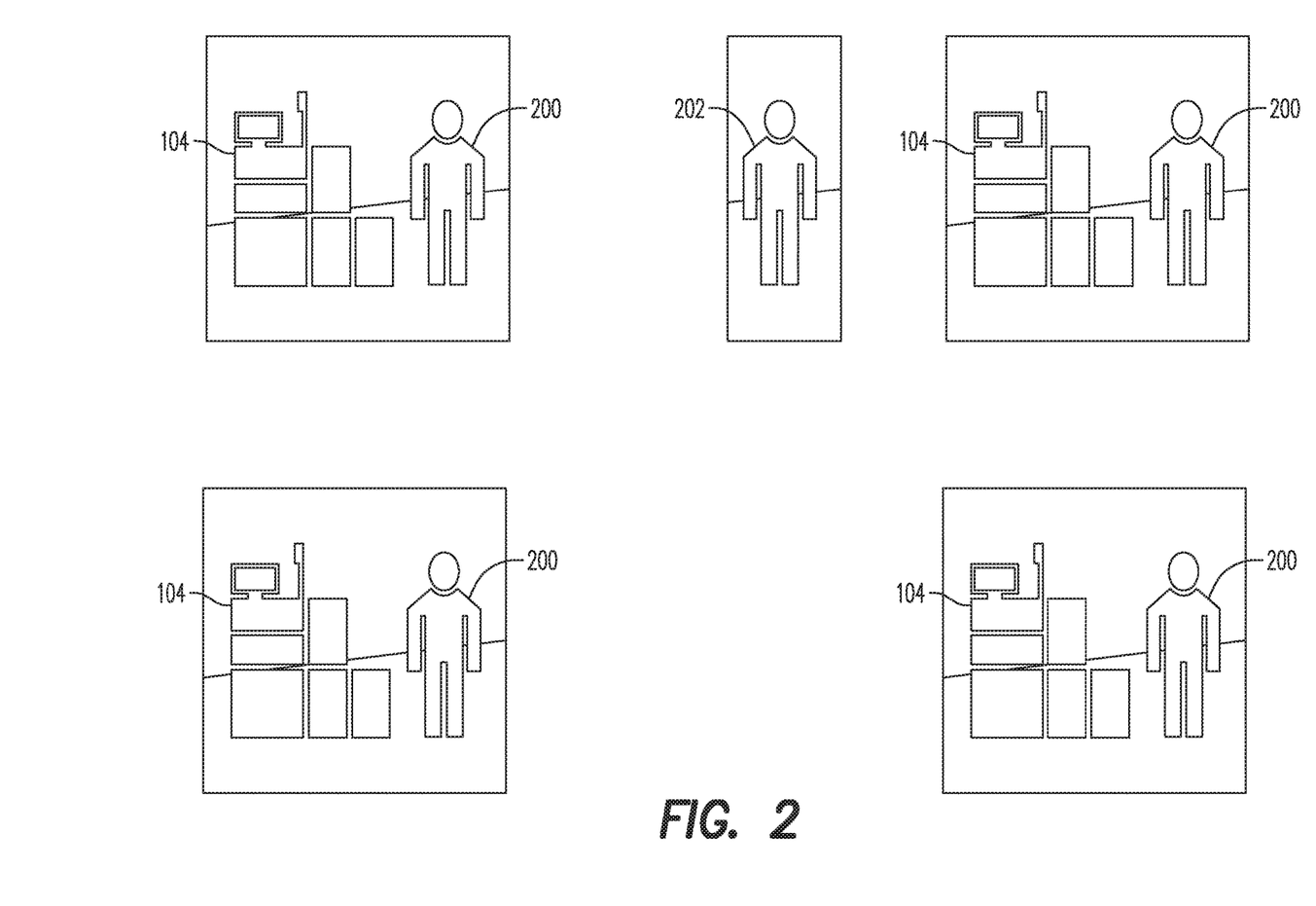
FIG. 2 is a diagram of an example of a self-checkout terminal configuration, in accordance with some aspects of some embodiments herein.
Figure 3:
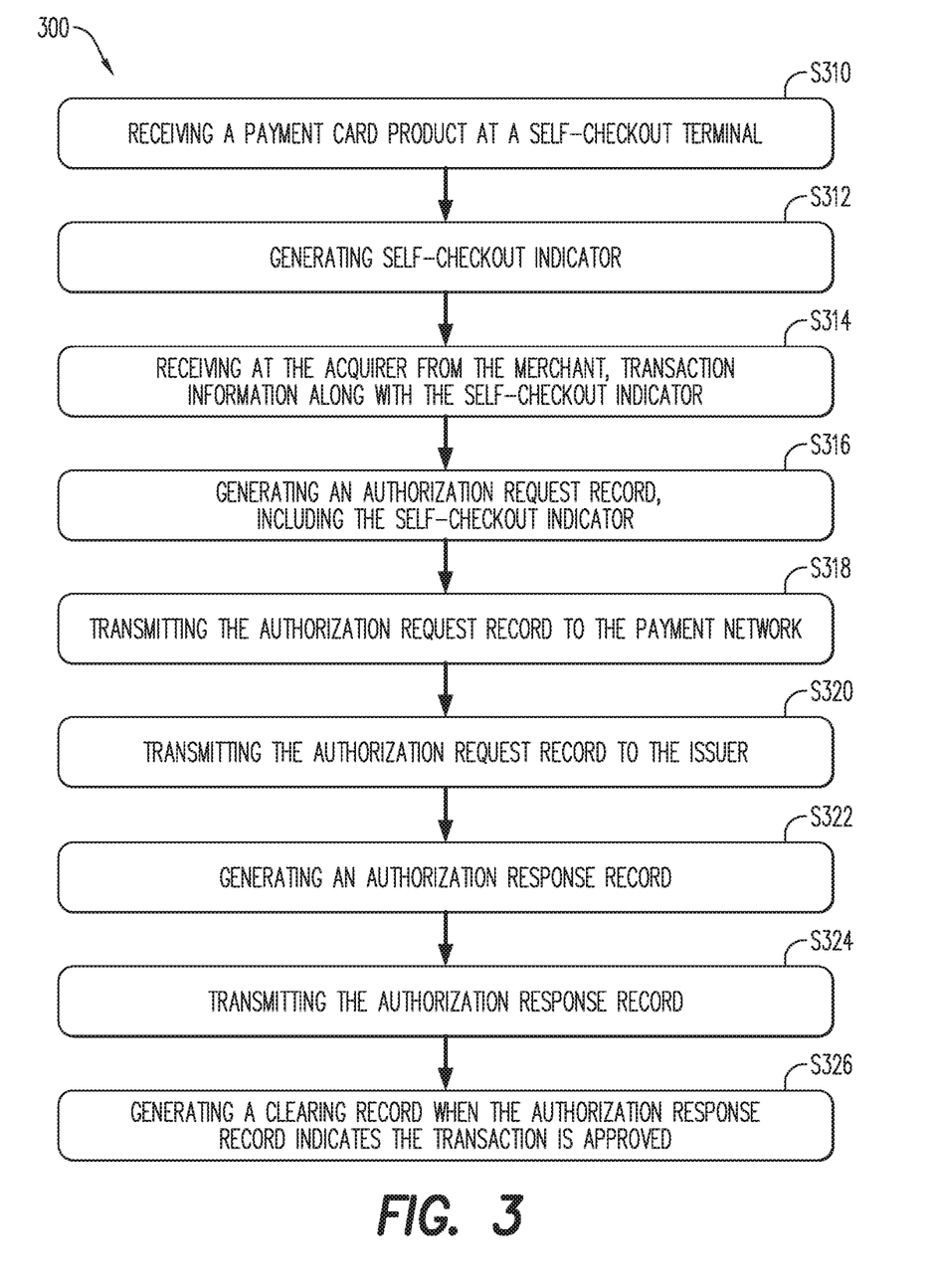
FIG. 3 is a flow diagram illustrating a process that may be performed in accordance with aspects of some embodiments herein.

Turning to FIGS. 1-3, FIG. 3 illustrates a method 300 that may be performed by some or all of the elements of payment system 100 described with respect to FIGS. 1 and 2, according to some embodiments of the present invention. The flow chart(s) described herein do not imply a fixed order to the steps, and embodiments of the present invention may be practiced in any order that is practicable. Note that any of the methods described herein may be performed using any suitable combination of hardware (e.g., circuit(s)), software or manual means. For example, a non-transitory computer-readable storage medium (e.g., a fixed disk, a floppy disk, a CD, a DVD, a Flash drive, or a magnetic tape) may store thereon instructions that, when executed by a machine, result in performance according to any of the embodiments described herein. In one or more embodiments, the system 100 is conditioned to perform the process 300, such that the system 100 is a special purpose element configured to perform operations not performable by a general purpose computer or device.

In one or more embodiments, prior to beginning process 300, a merchant 109 may assign an identification code 101 to every SCO terminal 104 at the merchant's establishment. As used herein, a SCO terminal is a type of merchant device, and the terms "SCO terminal" and "merchant device" may be used interchangeably. The identification code 101 may be any unique and suitable identifier for the particular SCO terminal 104. As described above, a SCO terminal 104 may be defined as an unattended or semi-attended cardholder activated terminal (CAT) that supports more than one cardholder verification method and allows a cardholder to process their own purchase without direct interaction with a card acceptor agent ("attendant"). In other words, a SCO terminal 104 may be any merchant device that is activated by the cardholder, without any direct interaction with the merchant.

As used herein, a payment card (e.g., all MasterCard brands—MasterCard, Cirrus and Maestro) may be any type of credit, debit or pre-paid card. Other suitable payment cards may be used.

To initiate the transaction, a customer 200 visits a retail store (not shown) operated by a merchant 109, selects goods (not shown) that he/she wants to purchase, carries the goods to a merchant device 104, such as a self-checkout (SCO) terminal, and presents his/her payment card 102 for receipt by the SCO terminal 104 at S310. The SCO terminal 104 may be a dual-capable cardholder activated terminal whereby the SCO terminal 104 may accept either a personal identification number (PIN) or a signature as a cardholder verification method. In one or more embodiments, the retail store may include several SCO terminals 104 that may be completely unattended or may be semi-attended whereby an attendant 202 is in the area, but the attendant 202 may not actively monitor, or directly interact with, the payment transaction.

The SCO terminal 104 reads the customer's payment card account number from the payment card 102, and identifying itself as a SCO, generates a self-checkout (SCO) indicator 103 at S312. The SCO indicator 103 may be any unique and suitable identifier and may, in some embodiments, include the SCO terminal identification code 101. For example, the SCO indicator 103 may be a combination of a conventional cardholder-activated-terminal indicator (e.g., code) and a conventional authorization point of sale terminal attendance data element (e.g., code). The use of existing codes and indicators in current authorization and clearing records combined in a new way to form the SCO indicator 103, may minimize the costs involved with implementing one or more embodiments. In some embodiments, if a new field is created, a more robust series of codes may be used as an SCO indicator. For example, 1 may indicate a cardholder activated stationary merchant owned terminal with attendant monitoring transactions; 2 may indicate a cardholder activated stationary merchant owned terminal without attendant monitoring transactions; 3 may indicate a cardholder activated cardholder owned mobile terminal with attendant monitoring transactions; 4 may indicate a cardholder activated cardholder owned mobile terminal without attendant monitoring transactions; 5 may indicate cardholder activated cardholder owned mobile terminals with merchant's application attendant monitoring transactions; 6 may indicate cardholder activated cardholder owned mobile terminal with merchant's application without attendant monitoring transactions; 7 may indicate cardholder activated cardholder owned mobile terminal with $3^{rd}$ party application with attendant monitoring transactions; and 8 may indicate cardholder activated cardholder owned mobile terminal with $3^{rd}$ party application without attendant monitoring transactions.

In one or more embodiments, the SCO terminal 104 receives one of a personal identification number (PIN) and a signature at the dual-capable cardholder activated terminal as a cardholder verification method. In one or more embodiments as indication of the cardholder verification method (i.e., PIN or signature) may be included in the SCO indicator 103.

The SCO terminal 104 may include one or more processing elements 105. The processor 105 may, for example, be a conventional microprocessor, and may operate to control the overall functioning of the SCO terminal 104. The SCO terminal 104 may also include conventional peripheral components (not shown), in communication with and/or controlled by the processor, including but not limited to: (a) a keypad for receiving input from the customer or attendant; (b) a magnetic stripe reader for reading payment card account numbers and related information from magnetic stripe payment cards or slots to insert chip cards or antenna for contactless transactions; (c) one or more displays for providing output (e.g., identifying products presented for purchase and their prices, indicating transaction subtotals and totals, indicating transaction status, etc.); and (d) a communication controller for allowing the processor, and hence the SCO terminal 104, to engage in communication over data networks with other devices (e.g., a merchant processing system (not shown), an Acquirer 106 or its transaction processor (not shown), an Issuer 110, etc.). In one or more embodiments, at least one of the displays may be a touch screen, so as to provide an input function as well as an output function. In one or more embodiments, the SCO terminal 104 may include one or more memory and/or data storage devices 107, which may comprise any combination of one or more of a hard disk drive, RAM (random access memory), ROM (read only memory), flash memory, etc. The memory/data storage devices 107 may store software and/or firmware that programs the processor 105 and the SCO terminal 104 to perform functionality as described herein.

Returning to process 300, the SCO terminal 104 may read the customer's payment card account number from the payment card 102, and in S314 send the transaction information along with the SCO indicator 103 to an Acquirer Financial Institution (FI) 106 ("Acquirer"), with which the merchant maintains a relationship. In some embodiments the Acquirer 106 may use the SCO indicator 103 for fraud prevention purposes. In some embodiments, the Acquirer 106 may transmit the SCO indicator 103 to a fraud model processor 111 for further analysis regarding fraud prevention and detection, as indicated by directional arrow 173. As will be further described below, in some embodiments, the merchant 109, payment network 108, and issuer 110 may also transmit the SCO indicator 103 to the fraud model processor 111 for further analysis regarding fraud prevention and detection, as indicated by directional arrows 171, 175 and 177, respectively. In some embodiments, the fraud model processor 111 may be a single component that each of the merchant, acquirer, payment network and issuer communicates with, or each of the merchant, acquirer, payment network and issuer may include their own distinct fraud model processor 111. Again, visibility into SCO terminal transactions may also allow for faster identification of account data compromise events when SCO terminals may be at risk.

In one or more embodiments, the Acquirer 106 may operate an acquirer processor. As used herein, the acquirer processor may also be referred to as "Acquirer." The Acquirer 106 may operate in a conventional manner to receive payment account transaction data from the SCO terminal 104. The Acquirer 106 may request the PAN and once the Acquirer 106 receives the PAN, the Acquirer 106 may generate an authorization request record 117 in S316. The authorization request record 117 may include transaction data (e.g., payment card account number (PAN), the amount of the total purchase transaction, cash back (if any), and other information) and the SCO indicator 103, as well as additional data fields such as a fraud score by the payment system. Conventionally, the authorization request record simply indicates the transaction is an attended point of sale transaction, and does not typically include any indication that the transaction is occurring at a SCO terminal. Unlike conventional authorization request records, one or more embodiments include the self-checkout indicator 103 in the authorization request record to indicate the transaction is occurring at the SCO terminal 104, in addition to other information in the authorization request record.

The Acquirer 106 may then route/transmit the authorization request record 117 to the payment network 108 in S318. In some embodiments, the payment network 108 may use the SCO indicator 103 to generate a fraud score for an issuer financial institution (FI) ("Issuer") 110 that issued the customer's payment card 102. The payment network 108 may then transmit the authorization request record 117 to the Issuer 110 in S320. In one or more embodiments, the Issuer 110 may include a server computer or processor operated by the Issuer 110.

The Issuer 110 generates an authorization response record 119 in S322 in response to, and for association with, the authorization request record 117. In one or more embodiments, the Issuer 110 may use the SCO indicator 103 for fraud prevention purposes. In some embodiments, the Issuer 110 may transmit the SCO indicator 103 to the fraud model processor 111 for further analysis regarding fraud prevention and detection.

In one or more embodiments, the authorization request record 117 and the authorization response record 119 may collectively be referred to as an authorization record 116.

The Issuer 110 may be operated by or on behalf of a financial institution or Issuing Bank of the payment card ("Issuer"). For example, the Issuer 110 may perform such functions as (a) receiving and responding to requests for authorization of payment account transactions to be charged to payment accounts issued by the Issuer; and (b) tracking and storing transactions and maintaining account records.

The Issuer 110 may include a storage device/memory 112. The storage device 112 may comprise any appropriate information storage device, including combinations of magnetic storage devices (e.g., a hard disk drive), optical storage devices, mobile telephones, and/or semiconductor memory devices. In some embodiments, the storage device 112 may further store a SCO database 114, which may include an authorization record 116 (including the authorization request record 117 and the authorization response record 119) and a clearing record 118. In one or more embodiments, the Issuer 110 may analyze the information received from the Acquirer 106 and may insert an authorization response code into the authorization response record 119 before returning the authorization response record 119 to the SCO terminal 104 via the payment network 108 and Acquirer 106, each of whom may alter/enhance the record on its way back to the SCO terminal 104. In one or more embodiments, the SCO terminal 104 may send the authorization response record 119 to a service provider, who may format and send the authorization response record 119 to the Acquirer 106.

As described above, the authorization request record 117 and the authorization response record 119 may include the total transaction amount (inclusive of the purchase (if any)), cash back (if any) and the self-checkout indicator 103. In one or more embodiments, the self-checkout indicator 103 may be a combination of a conventional cardholder-activated-terminal indicator (e.g., code) and a conventional authorization point of sale terminal attendance data element. The inventors note that a benefit of using an existing field code may be to save time and money as the infrastructure already exists. For example, in one or more embodiments, the self-checkout indicator 103 may include CAT (cardholder-activated-terminal) 1 (with PIN), or CAT 2 (without PIN) with a POS Terminal Attendance data element of 0 indicating the terminal was unattended or semi-attended, in the existing respective fields in the authorization record 116.

In one or more embodiments, supplemental identifying data may be stored in a private data elements portion of the authorization record 116. In some embodiments, supplemental identifying data may include the SCO terminal identification code 101, which may or may not be included in the self-checkout indicator 103.

The payment card 102 must be valid and have a sufficient credit line to allow the purchase. As such, in addition to a credit risk assessment and other assessments made by the Issuer 110 in response to the authorization request, the Issuer 110 may also execute a fraud risk assessment (e.g., via the fraud model processor 111) to determine the risk of fraud associated with the transaction. In one or more embodiments, information that the purchase transaction occurred at a SCO terminal 104 may be used by a payment authorization platform (not shown) at the Issuer 110 during the authorization process. The additional information that the purchase occurred at a SCO terminal 104 may be a significant factor in the authorization platform's decision to approve or decline the transaction. In one or more embodiments, supplemental identifying data may be used by the Payment Network 108 (e.g., via the fraud model processor 111) to execute a fraud risk assessment to determine the risk of fraud associated with the transaction and score the transaction for the Issuer 110.

Arrows 151, 153, 155 trace the path of the authorization request from the SCO terminal 104 to the Issuer 110.

Turning back to method 300, after a determination is made whether to approve or decline the authorization request record 117, based on standard business logic, the Issuer 110 may respond to the authorization request by generating the authorization response record 119, as described above with respect to S322. In one or more embodiments, response messages may be limited to approved or declined.

Turning to S324, the authorization response record 119 is transmitted to the SCO terminal 104. If the authorization response record 119 from the Issuer 110 is positive, the Acquirer 106 sends an approved authorization message to the SCO terminal 104 with the appropriate data suitable elements. If the authorization response record 119 from the Issuer 110 is negative, the Acquirer 106 sends a decline authorization message to the SCO terminal 104. The path of the authorization response from the Issuer 110 to the SCO terminal 104 is traced by arrows 157, 159, 161.

If all is in order, and the Issuer 110 transmits a positive authorization response to the SCO terminal 104, the transaction at SCO terminal 104 is then completed and the customer leaves the store with the goods. A subsequent clearing transaction initiated by the merchant results in a transfer of the transaction amount from a customer's payment card account 120 to an account that belongs to the merchant. The SCO terminal 104 may generate the clearing record 118 based on the completed transaction and may send the clearing record 118 through the same path to the Issuer 110. The customer's payment card account 120 may be, for example, either a debit card account or a credit card account.

In the former case, the clearing transaction results in the funds being debited directly from the account 120. In the latter case, the clearing transaction results in a charge being posted against the account 120, and the charge subsequently appears on the customer's monthly credit card statement. During the clearing transaction, the clearing record 118 is generated at S326. The clearing record 118 may include the self-checkout indicator 103, as well as additional information supplied by the merchant (e.g., the payment account number (PAN) on the payment product). Other suitable information may be included in the clearing record 118. In one or more embodiments, the clearing record 118 may include the SCO terminal 104 used as supplied by the merchant 109 via the SCO terminal identification code 101, the terminal type (e.g., automated dispensing machine or self-service terminal), and whether the SCO terminal 104 was attended, semi-attended or unattended. In one or more embodiments, information (e.g., data elements) stored in the clearing record 118 may match data elements stored in the authorization record 116. In one or more embodiments, the self-checkout terminal indicator 103 may be stored in one of an existing shared field of the clearing record 118 and a new field of the clearing record 118.

The components of the system 100 as depicted in FIGS. 1 and 2 are only those that are needed for processing a single transaction. A typical payment system may process many purchase transactions (including simultaneous transactions) and may include a considerable number of payment account issuers and their computers/processors, a considerable number of acquirers and their computers/processors, and numerous merchants and their computer systems.

The foregoing description of the exemplary transaction may be considered to be somewhat simplified in some respects. For example, a merchant processing system (not shown) may be interposed between the merchant device and the acquirer FI. As is familiar to those who are skilled in the art, a merchant processing system may be operated by or on behalf of the merchant to form part of the communications path between the acquirer FI and a considerable number of merchant devices operated by the merchant. It is also often the case that a third party transaction processing service, such as a payment services provider (PSP), may operate to handle payment card transactions on behalf of the acquirer and on behalf of a large number of other like financial institutions.

Figure 4:
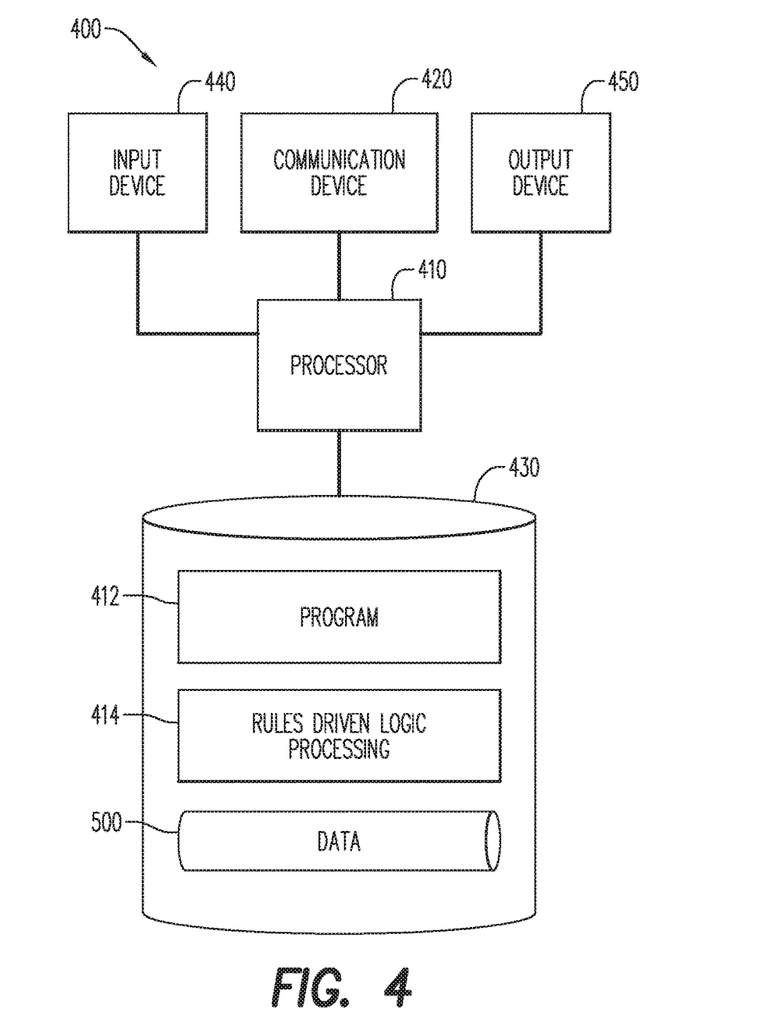
FIG. 4 is a block diagram of a system, in accordance with some aspects of some embodiments herein embodiments.

Note that the embodiments described herein may be implemented using any number of different hardware configurations. For example, FIG. 4 illustrates a Self-Checkout Terminal Platform 400 that may be, for example, associated with the self-checkout terminal system 100 of FIG. 1. In one or more embodiments, the platform 400 may be stored at one of the self-checkout terminal 104 and the Issuer 110. The Self-Checkout Terminal Platform 400 comprises a self-checkout terminal processor or module 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more users or computers. The Self-Checkout Terminal Platform 400 further includes an input device 440 (e.g., a computer mouse and/or keyboard to enter information) and an output device 450 (e.g., a computer monitor or printer to output a transaction information report).

The processor 410 also communicates with a storage device/memory 430. The storage device 430 may comprise any appropriate information storage device, including combinations of magnetic storage devices (e.g., a hard disk drive), optical storage devices, mobile telephones, and/or semiconductor memory devices. The storage device 430 stores a program 412 and/or self-checkout terminal platform logic 414 for controlling the processor 410. The processor 410 performs instructions of the programs 412, 414, and thereby operates in accordance with any of the embodiments described herein. For example, the processor 410 may receive a purchase authorization request which may then be analyzed by the processor 410 to automatically determine whether the transaction involves a self-checkout terminal.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" or "retrieved" by or "transmitted" to, for example: (i) the Self-Checkout Terminal Platform 400 from another device; or (ii) a software application or module within the Self-Checkout Terminal Platform 400 from another software application, module, or any other source.

In some embodiments (such as shown in FIG. 4), the storage device 430 further stores a self-checkout terminal database 500. Some examples of databases that may be used in connection with the Self-Checkout Terminal Platform 400 will now be described in detail with respect to FIG. 5. Note that the database described herein is only an example, and additional and/or different information may actually be stored therein. Moreover, various databases might be split or combined in accordance with any of the embodiments described herein.

Figure 5:
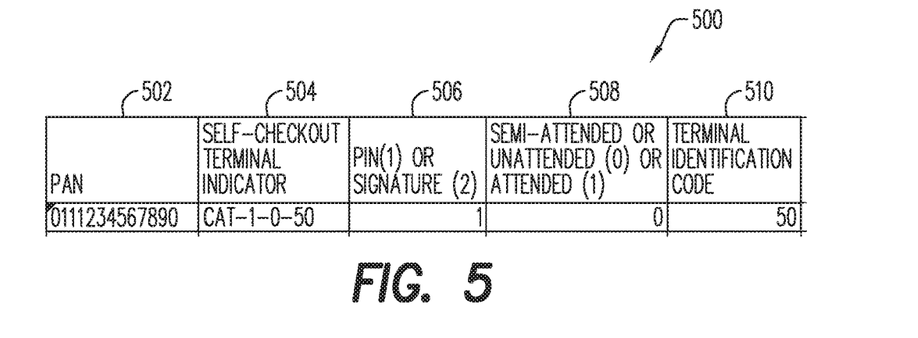
FIG. 5 is a table in accordance with some aspects of some embodiments herein.

Referring to the self-checkout terminal database in FIG. 5, a table 500 is shown that represents the self-checkout terminal database 500 that may be stored in memory 430 (Self-Checkout Terminal Platform 400) according to some embodiments. The table 500 may include, for example, the authorization record with entries identifying a self-checkout terminal 104 used in a transaction. The table 500 may define fields 502, 504, 506, 508 and 510 for each of the entries. The fields 502, 504, 506, 508 and 510 may, according to some embodiments, specify: a card account PAN 502 used in a transaction, a self-checkout terminal indicator 504; a PIN or signature CVM indicator 506; a partially attended flag 508; and a terminal identifier 510. Other suitable fields may be used in addition to, or instead of, the fields listed herein. The self-checkout terminal database 500 may be created and updated, for example, based on information electrically received on a periodic basis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a self-checkout terminal module. The method steps can then be carried out using the distinct software modules and/or sub-modules of the system, as described above, executing on one or more hardware processors 410 (FIG. 4). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
    identifying, at a merchant device, a purchase transaction at a self-checkout terminal, wherein the purchase transaction is via a payment card product;
    generating a self-checkout indicator;
    generating a fraud score based on the self-checkout indicator;
    receiving, by a computer from the merchant device, a payment authorization request record for the purchase transaction, wherein the payment authorization request record comprises payment data and the self-checkout indicator; and transmitting information associated with the self-checkout indicator to an issuer.

2. The method of claim 1, wherein the self-checkout terminal is a cardholder activated terminal (CAT) that is one of unattended or semi-attended.

3. The method of claim 2, wherein the self-checkout indicator further comprises an indication the CAT is one of unattended or semi-attended.

4. The method of claim 1, further comprising:
processing the purchase transaction at the self-checkout terminal without direct interaction with an attendant.

5. The method of claim 1, further comprising:
identifying the self-checkout terminal as dual-capable cardholder activated terminal.

6. The method of claim 5, further comprising:
receiving one of a personal identification number (PIN) and a signature at the dual-capable cardholder activated terminal as a cardholder verification method.

7. The method of claim 6, wherein the self-checkout indicator further comprises an indication that the cardholder verification method is the PIN or the signature.

8. The method of claim 1, further comprising:
generating a payment authorization request record at an acquirer.

9. The method of claim 8, further comprising:
generating an authorization response record indicating the payment transaction is one of approved or declined.

10. The method of claim 9, further comprising:
transmitting the authorization response record to the merchant device.

11. A method comprising:
identifying, at a merchant device, a purchase transaction at a self-checkout terminal, wherein the purchase transaction is via a payment card product;
generating a self-checkout indicator;
receiving, by a computer from the merchant device, a payment authorization request record for the purchase transaction, wherein the payment authorization request record comprises payment data and the self-checkout indicator;
transmitting information associated with the self-checkout indicator to an issuer;
generator a payment authorization request record at an acquirer;
generating an authorization response record indicating the payment transaction is one of approved or declined; and
in response to an authorization response record indicating the payment transaction is approved, executing a clearing transaction, by the merchant device, wherein the self-checkout indicator is stored in a clearing record associated with the clearing transaction.

12. The method of claim 11, wherein the stored self-checkout indicator is stored in one of an existing shared field of the clearing record and a new field of the clearing record.

13. The method of claim 11, wherein the clearing transaction is initiated subsequent completion of the purchase transaction.

14. A system comprising:
a communication device operative to communicate with a merchant device to obtain a request for authorization to use a payment card product for a purchase transaction;
a self-checkout terminal processor;
a memory in communication with the self-checkout terminal processor and storing program instructions, the self-checkout terminal processor operative with the program instructions to perform functions as follows:
identifying, at a merchant device, a purchase transaction at a self-checkout terminal, wherein the purchase transaction is via a payment card product;
generating a self-checkout indicator;
receiving, by a computer from the merchant device, a payment authorization request record for the purchase transaction, wherein the payment authorization request record comprises payment data and the self-checkout indicator; and
transmitting information associated with the self-checkout indicator to an issuer; and
a fraud model processor operative to analyze the self-checkout indicator for fraud prevention purposes.

15. The system of claim 14, wherein the self-checkout terminal is a cardholder activated terminal (CAT) that is one of attended or semi-attended.

16. The system claim 15, wherein the self-checkout indicator further comprises an indication the CAT is one of attended or semi-attended.

17. The system of claim 14, wherein the self-checkout terminal allows a cardholder to process the purchase transaction without direct interaction with an attendant.

18. The system of claim 14, wherein:
the self-checkout terminal is a dual-capable cardholder activated terminal.

19. A system comprising:
a communication device operative to communicate with a merchant device to obtain a request for authorization to use a payment card product for a purchase transaction;
a self-checkout terminal processor; and
a memory in communication with the self-checkout terminal processor and storing program instructions, the self-checkout terminal processor operative with the program instructions to perform functions as follows:
identifying, at a merchant device, a purchase transaction at a self-checkout terminal, wherein the purchase transaction is via a payment card product;
generating a self-checkout indicator, wherein the self-checkout indicator is stored in a clearing record associated with a clearing transaction;
receiving, by a computer from the merchant device, a payment authorization request record for the purchase transaction, wherein the payment authorization request record comprises payment data and the self-checkout indicator; and
transmitting information associated with the self-checkout indicator to an issuer.

* * * * *